United States Patent [19]

Yoshioka

[11] Patent Number: 4,765,431

[45] Date of Patent: Aug. 23, 1988

[54] SWING ARM SUPPORTING STRUCTURE IN MOTORCYCLE

[75] Inventor: Toshiharu Yoshioka, Saitama, Japan

[73] Assignee: Honda Giken Kogyo Kabushiki Kaisha, Tokyo, Japan

[21] Appl. No.: 909,393

[22] Filed: Sep. 19, 1986

[30] Foreign Application Priority Data

Sep. 20, 1985 [JP] Japan .............. 60-144057[U]

[51] Int. Cl.$^4$ .............................. B62K 25/26
[52] U.S. Cl. ............................ 180/219; 180/227; 280/284
[58] Field of Search ............ 180/219, 227, 291, 228; 280/284

[56] References Cited

U.S. PATENT DOCUMENTS 4,556,119 12/1985 Shiratsuchi .................. 180/219

4,706,774 11/1987 Tsuboi .......................... 180/227

Primary Examiner—John J. Love
Assistant Examiner—Mitchell J. Hill
Attorney, Agent, or Firm—Sughrue, Mion, Zinn, Macpeak & Seas

[57] ABSTRACT

In a motorcycle in which a rear-wheel supporting swing arm is vertically swingably supported by pivot bolts inserted in a swing arm pivot member provided on the motor cycle body, the swing arm pivot member is modified into a box-shaped one which is made up of the right and left side walls and the right and left partition walls provided between the side walls. Two pivot bolts are inserted respectively into the right side wall and right partition wall and into the left side wall and left partition walls to support the right and left arms of the swing arm, respectively, thereby to vertically swingably support the swing arm.

8 Claims, 4 Drawing Sheets

SWING ARM SUPPORTING STRUCTURE IN MOTORCYCLE

BACKGROUND OF THE INVENTION

1. Field of the Invention

This invention relates to a swing arm supporting structure in a two-wheeled motorcycle.

2. Background Art

A rear wheel suspension is extensively employed in motorcycles in which a swing arm supporting the rear wheel is supported at its base end portion by a pivot bolt so as to rotate vertically. The pivot bolt is inserted into a swing arm pivot member provided on the motorcycle body. A cushion is provided between the swing arm and the body frame in order to absorb the vertical vibration of the rear wheel which is caused by uneven roads to thereby prevent the transmission of such vibration to the motorcycle body.

In the above-described rear wheel suspension, the swing arm pivot member must have a high rigidity because a variety of stress is applied thereto. Therefore, the swing arm pivot member is relatively large in thickness, with the result that the reduction in weight of the motorcycle body frame is limited to some extent.

SUMMARY OF THE INVENTION

Accordingly, an object of this invention is to provide a swing arm supporting structure for a motorcycle in which the swing arm pivot member is decreased in weight while its rigidity is maintained high.

The foregoing object and other objects of the invention have been achieved by the provision of a swing arm supporting structure for a motorcycle in which a swing arm supporting the rear wheel is supported through its base end portion by a pivot bolt to be vertically swingable. The pivot bolt is inserted into a swing arm pivot member provided on the motorcycle body. This structure, according to the invention, comprises a swing arm pivot member in the form of a box having three serial chambers formed with right and left side walls and right and left partition walls provided between the right and left side walls. Two pivot bolts are inserted respectively into the right side wall and right partition wall and into the left side wall and left partition wall from both sides of the swing arm pivot member to support the base end portions of right and left arms respectively. These right and left arms are two prongs of the swing arm and are inserted respectively between the right side wall and right partition wall and between the left side wall and left partition wall, to thereby vertically swingably support the swing arm.

The nature, principle and utility of the invention will become more apparent from the following detailed description when read in conjunction with the accompanying drawings.

DETAILED DESCRIPTION OF THE PREFERRED EMBODIMENTS

This invention will be described with reference to its preferred embodiment shown in the accompanying drawings.

Figure 1:
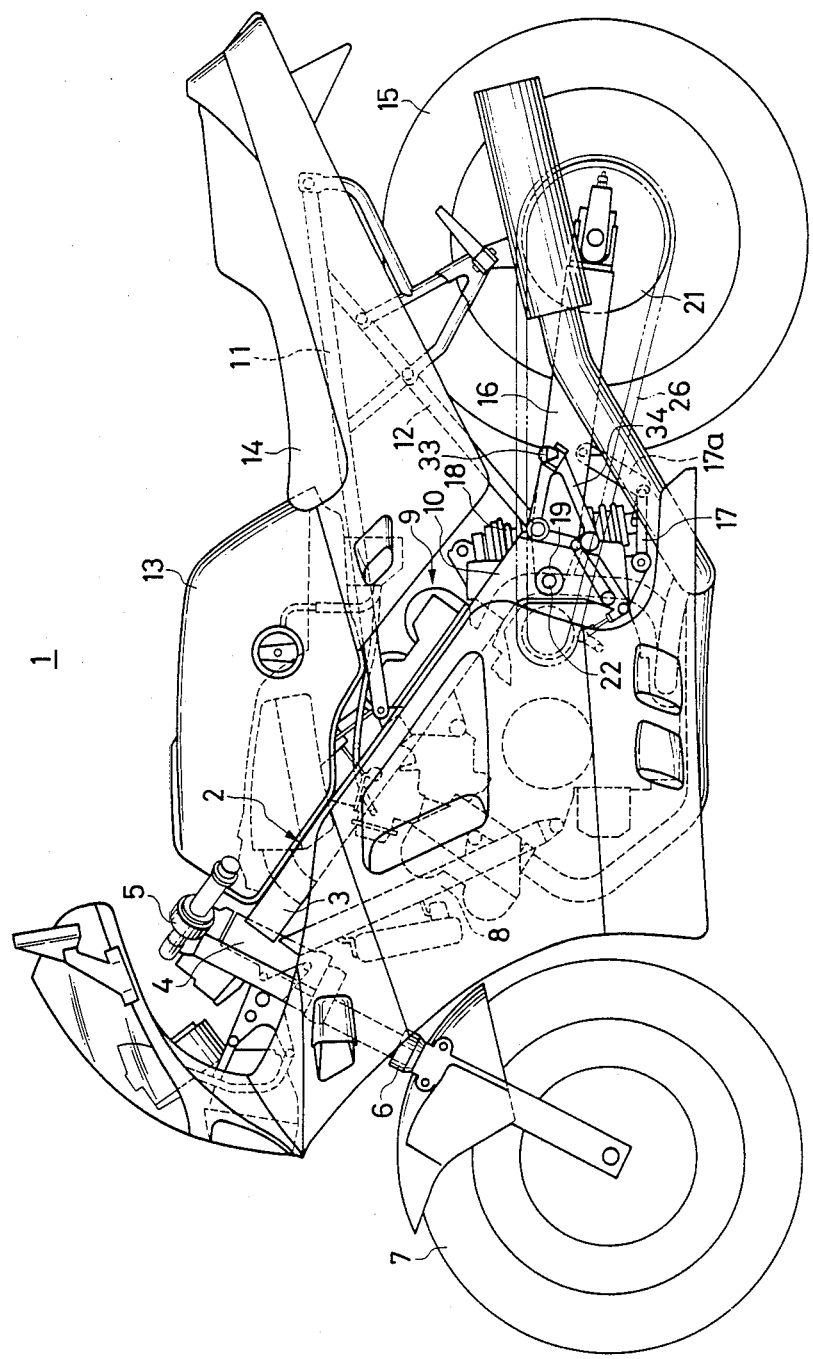
FIG. 1 is a side view of a motorcycle to which the technical concept of this invention is applied.
Figure 2:
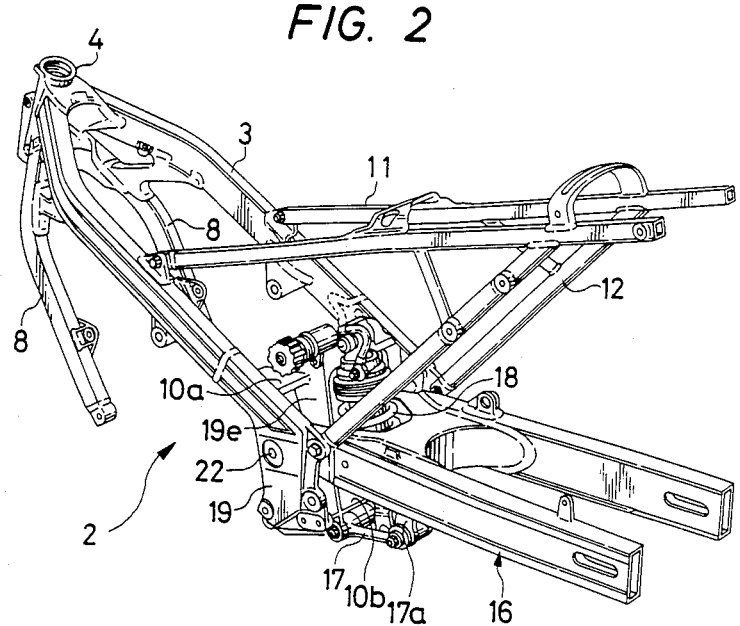
FIG. 2 is a perspective view of the body frame of the motorcycle of FIG. 1.

A motorcycle 1 is shown in FIGS. 1 and 2 to which the technical concept of the invention is applied. A handle bar 5 is rotatably supported by a head pipe 4 which is provided at the front end of the main (twin tube) 3 of its body frame 2. A front wheel 7 is rotatably supported by the lower end portions of a front fork which is turned by the handle bar 5. An engine is provided below the main pipe 3, i.e., it is supported by the main pipe 3 and down tubes 8 extending downwardly from the head pipe 4.

A pivot plate 10 is provided at the rear end of the main pipe 3. The pivot plate 10 is connected to seat rail stays 12 adapted to support seat rails 11 which extend backwardly from the mid-section of the main pipe 3. The seat rail stays 12 and the seat rails 11 constitute a sub-frame. A fuel tank 13 is installed on the main pipe 3 and the front part of the seat rails 11. A seat 14 is provided on the rear of the seat rails 11 in such a manner that it is located behind the fuel tank 13. A passenger's step 33 is supported by a step holder 34.

The frame is made up of two parts, the main frame 2 and the sub-frame. The main frame 2 is an aluminum twin-tube type diamond frame. The sub-frame is made up of a steel pipe rectangular in section which is high enough both in mechanical strength and in rigidity to bear its load including a person. The twin tube of the main frame 2 is made of a 28×60 mm protruded aluminum box tube, and the down tube 8 is a 30×40 mm protruded aluminum box tube. Cast aluminum is used for the head pipe 4 and the engine mount bracket. The sub-frame is fixedly bolted to the twin-tube main frame 2 at four points. Therefore, the frame is considerably strong and light, and significantly high in rigidity, thus being durable against twisting.

The rear fork 16 is also made of the protruded aluminum, and therefore it is lighter than the conventional rear fork although it is substantially equal in mechanical strength and rigidity to the conventional rear fork.

A swing arm assembly (rear fork) 16 rotatably supporting a rear wheel 15 is supported by the pivot plate 10 in such a manner that the swing arms of the assembly can swing vertically. A suspension member 18 is provided between the pivot plate 10 and the swing arm assembly 16 through a link mechanism (tension rod mechanism) 17.

As shwon in FIGS. 1 and 2, a bell crank 17a is provided which rotatably supports and connects together the rear fork 16, the lower end portion of the suspension member 18 (shock absorber), and the rear end of the link 17 (tension rod).

Figure 3:
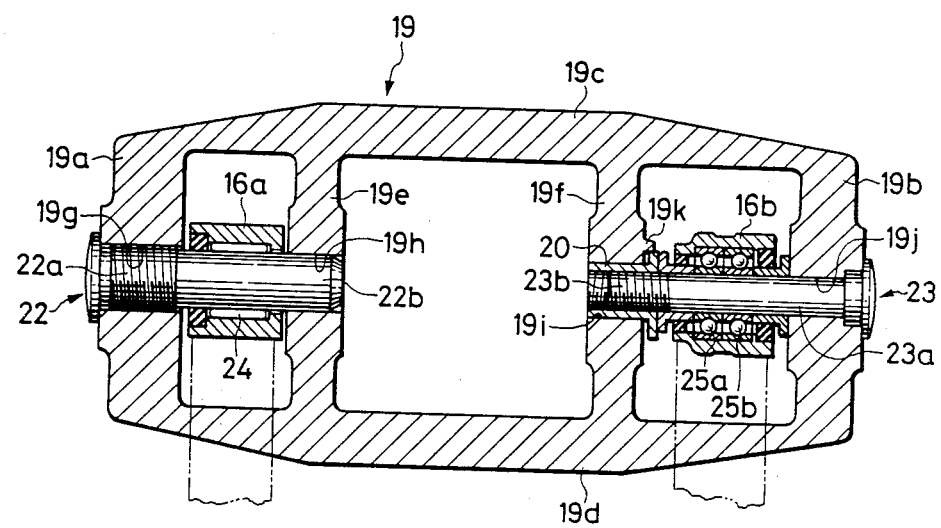
FIG. 3 is a sectional view of a swing arm pivot member in a swing arm supporting structure according to the invention.

The swing arm assembly (rear fork) 16 is divided into the right and left arms (prongs) at its pivoting end. As shown in FIG. 3, the pivot plate 10 has integrally formed therewith a swing arm pivot member 19 which supports the right and left arm base end portions 16b and 16a of the right and left arms of the swing arm assembly 16. The swing arm pivot member 19, as shown in FIG. 2, has right and left side walls 19b and 19a which are connected to each other through cross members 19c and 19d, and two partition walls 19e and 19f which are provided between the right and left side walls 19b and 19a and are connected to the cross members 19c and 19d. Pivot bolt inserting holes 19g, 19h, 19i and 19j are formed in the left side wall 19a, the left partition wall 19e, the right partition wall 19f and the right side wall 19b, respectively. The pivot bolt inserting hole 19g in the left side wall 19a is female-threaded. A pivot nut 20 is fitted in the pivot bolt inserting hole 19i of the right partition wall 19f, and its rotation is prevented by a flange 19k.

The left arm base end portion 16a, on which a sprocket 21 (FIG. 1) is mounted, is inserted between the left side wall 19a and the left partition wall 19e. The right arm base end portion 16b of the swing arm assembly 16 is inserted between the right side wall 19b and the right partition wall 19f. The left arm base end portion 16a and the right arm base end portion 16b of the swing arm assembly 16 are supported by pivot bolts 22 and 23, respectively.

The left pivot bolt 22 has a male-threaded portion near the head. The pivot bolt 22 has the male-threaded portion engaged with the female-threaded hole 19g in the left side with its end portion inserted into the pivot bolt inserting hole 19h of the left partition wall 19e, to support the left arm base end portion 16a of the swing arm assembly 16 through needle bearings 24. On the other hand, the right pivot bolt 23 has a male-threaded end portion. The pivot bolt 23 has the male-threaded end portion engaged with the pivot nut 20 with its shank 23a inserted into the pivot bolt inserting hole 19j of the right side wall 19b, to support the right arm base end portion 16b of the swing arm assembly 16 through ball bearings 25a and 25b.

Figure 6:
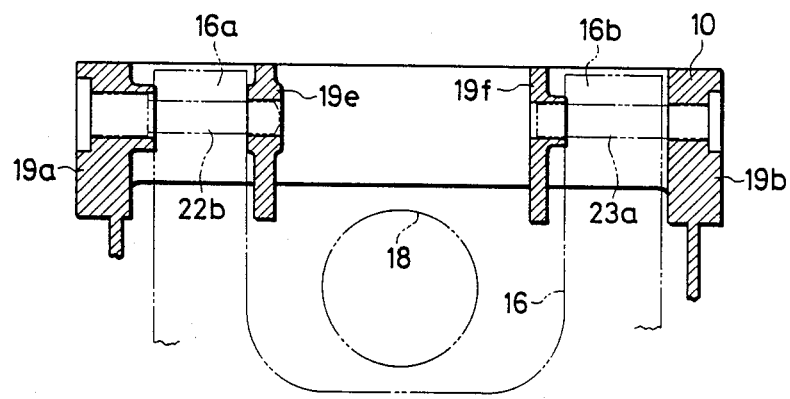

The swing arm pivot member 19 of FIG. 3 is exemplary. A more realistic swing arm pivot member 19 having the same elements is shown in the three orthogonal views of FIGS. 4, 5 and 6.

Figure 4:
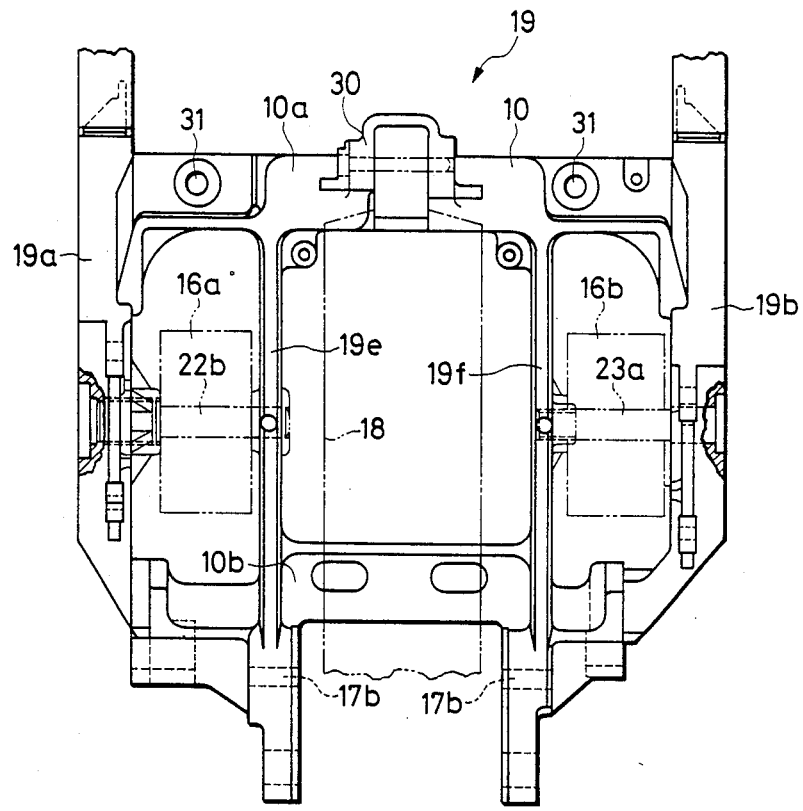
FIGS. 4, 5 and 6 are orthogonal views of another embodiment of the invention.

In FIG. 4, these is an upper connecting member 10a extending horizontally, which is provided with a mount portion 30 for mounting an upper end of the suspension member 18. Further, a pair of holes 31 are formed in the connecting member 10a for mounting the engine. Further, right and left partition walls 19f and 19e have lower end portions provided with pivot portions 17b which pivotally support each front end of the tension rod 17.

Furthermore, there is a lower connecting member 10b extending horizontally. The pivot portions 17b are positioned lower than the position of the lower member 10b.

Figure 5:
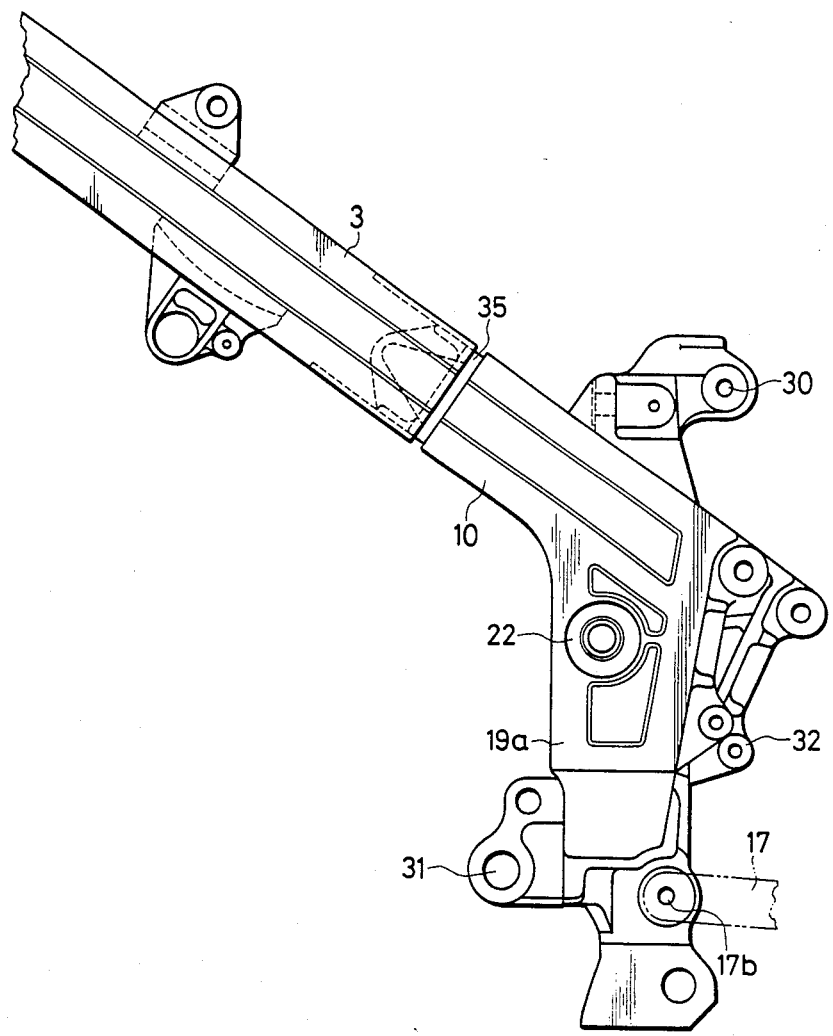

In FIG. 5, there are holes 32 for fixing the step holder 34 shown in FIG. 1. The pivot plate 10 is formed by casting, and is welded to the tube 3 at 35.

As is apparent from the above description, the swing arm assembly is so supported that it is swingable vertically. The right arm base end portion 16b of the swing arm assembly 16 can be positively supported when the force is exerted on it which is provided when the swing arm assembly 16 is pulled to the right hand side of the body by the chain 26 applying torque to the sprocket 21 during the driving of the motorcycle. In addition, the pivot member 19 can be made smaller in weight than the conventional one.

As was described above, the right and left arm base end portions of the swing arm assembly supporting the rear wheel are vertically swingably supported by the pivot bolts inserted into the swing arm pivot member which is provided on the motor cycle body. According to the invention, the swing arm pivot member comprises the right and left side walls and the right and left partition walls provided between the right and left side walls. The right and left arm base end portions of the swing arm assembly are inserted between the right side wall and the right partition wall and between the left side wall and the left partition wall, respectively, and are supported respectively by pivot bolts which are inserted respectively into the right side wall and the right partition wall and into the left side wall and the left partition wall so that the swing arm assembly is supported thereby. Therefore, the swing arm pivot member can be decreased in weight while its rigidity is maintained high.

What is claimed is:

1. In a motorcycle in which a swing arm supporting a rear wheel is vertically swingably supported through a base end portion thereof by a pivot bolt inserted in a swing arm pivot member provided on the motorcycle body, a swing arm supporting structure comprising:
   a swing arm pivot member in the form of a box having three serial chambers formed between right and left side walls and right and left partition walls provided between said right and left side walls; and
   two pivot bolts inserted respectively into said right side wall and right partition wall and into said left side wall and left partition wall from both sides of said swing arm pivot member to support base end portions of right and left arms respectively of said swing arm inserted respectively between said right side wall and right partition wall and between said left side wall and left partition wall, thereby to vertically swingably support said swing arm.

2. A motorcycle body, comprising:
   a rear fork rotatably supporting between two rear arms a rear motorcycle wheel and having two forwardly extending arms;
   a main frame having at a rear lower portion a swing arm pivot member, said swing arm pivot member comprising two vertically extending outer side walls attached to said main frame, two vertically extending inner walls disposed between said outer side walls and upper and lower horizontally extending connecting portions connecting respectively upper and lower portions of said outer side walls and of said inner walls to form three lateral chambers between said outer side walls and said inner walls; and
   two bolts inserted into a respective outer side wall and a respective inner wall and rotatably supporting therebetween a respective forwardly extending arm of said rear fork.

3. A motorcycle body as recited in claim 2, wherein all said chambers are open at front and rear faces thereof, and wherein said outer side walls, said inner walls and said connecting portions are integrally formed, one of said bolts on a sprocket side of said motorcycle being threadedly engaged with one of said outer side walls and the other of said bolts being threadedly engaged with one of said inner walls.

4. A motorcycle as recited in claim 3, further comprising:
   a needle bearing between said bolt on said sprocket side and a respective forwardly extending arm of said rear fork; and
   a ball bearing between said other bolt and said respective forwardly extending arm of said rear fork.

5. A motorcycle as recited in claim 2, further comprising a shock absorbing means, a top end portion of said shock absorbing means being mounted to said upper horizontally extending connecting portion.

6. A motorcycle as recited in claim 2, further comprising a tension rod whose front end is pivotally secured to said inner walls.

7. A motorcycle as recited in claim 6, further comprising a shock absorbing means and a bell crank means, said bell crank means rotatably supporting and connecting together said rear fork, a lower end portion of said shock absorbing means and a rear end portion of said tension rod.

8. A motorcycle as recited in claim 7, wherein said tension rod is provided with a pivot portion which is positioned lower than the position of said lower horizontally extending portion.

* * * * *